(12) United States Patent
Garcia-Franco et al.

(10) Patent No.: US 6,391,998 B1
(45) Date of Patent: May 21, 2002

(54) PROCESSING OLEFIN COPOLYMERS

(75) Inventors: Cesar A. Garcia-Franco, Houston, TX (US); David J. Lohse, Bridgewater, NJ (US); Robert A. Mendelson, Houston, TX (US); Lewis J. Fetters, Annandale; Scott T. Milner, Clinton, both of NJ (US); Nikos Hadjichristidis, Athens (GR); David W. Mead, Anne Harbor, MI (US)

(73) Assignee: ExxonMobil Chemical Patents, Inc., Houston, TX (US)

( * ) Notice: Subject to any disclaimer, the term of this patent is extended or adjusted under 35 U.S.C. 154(b) by 0 days.

(21) Appl. No.: 09/943,540

(22) Filed: Aug. 30, 2001

Related U.S. Application Data

(62) Division of application No. 09/939,269, filed on Aug. 23, 2001, and a division of application No. 09/020,270, filed on Feb. 6, 1998.
(60) Provisional application No. 60/037,149, filed on Feb. 14, 1997.

(51) Int. Cl.$^7$ .................. C08F 299/00; C08F 210/00; C08F 210/02; C08F 210/16
(52) U.S. Cl. ............... 526/348; 526/348.2; 526/348.6; 526/352
(58) Field of Search ............................ 526/348, 352, 526/348.2, 348.6

(56) References Cited

U.S. PATENT DOCUMENTS

| | | |
|---|---|---|
| 3,645,992 A | 2/1972 | Elston |
| 5,026,798 A | 6/1991 | Canich |
| 5,055,438 A | 10/1991 | Canich |
| 5,064,802 A | 11/1991 | Stevens et al. |
| 5,096,867 A | 3/1992 | Canich |
| 5,218,071 A | 6/1993 | Tsutsui et al |
| 5,324,800 A | 6/1994 | Welborn, Jr. et al. |
| 5,665,800 A | 9/1997 | Lai et al. |
| 5,703,187 A | 12/1997 | Timmers |

FOREIGN PATENT DOCUMENTS

| | | | |
|---|---|---|---|
| EP | EP 0 416 815 B | | 3/1991 |
| JP | 59-51905 | | 3/1984 |
| WO | WO 94/07930 | * | 4/1994 |

OTHER PUBLICATIONS

"Metallocene and Other Single Site Catalysts,"J. Stevens, Dow chemical Company, (1994).
"Melt Elasticity in Linear PE Containing Long Branches, "Hogan, et al, SPE Journal, pp. 87–90, (1967).

* cited by examiner

*Primary Examiner*—David W. Wu
*Assistant Examiner*—Caixia Lu
(74) *Attorney, Agent, or Firm*—Charles Edwin Runyon Jr.

(57) ABSTRACT

The invention is directed to essentially saturated hydrocarbon polymer composition comprising essentially saturated hydrocarbon polymers having A) a backbone chain, B) a plurality of essentially hydrocarbyl sidechains connected to A), said sidechains each having a number-average molecular weight of from 2500 Daltons to 125,000 Daltons and a MWD by SEC of 1.0–3.5; and having A) a Newtonian limiting viscosity ($\eta_0$) at 190° C. at least 50% greater than that of a linear olefinic polymer of the same chemical composition and weight average molecular weight, preferably at least twice as great as that of said linear polymer, B) a ratio of the rubbery plateau modulus at 190° C. to that of a linear polymer of the same chemical composition less than 0.5, preferably <0.3, C) a ratio of the Newtonian limiting viscosity ($\eta_0$) to the absolute value of the complex viscosity in oscillatory shear ($\eta^*$)at 100 rad/sec at 190° C. of at least 5, and D) a ratio of the extensional viscosity measured at a strain rate of 1 sec$^{-1}$, 190° C., and time=3 sec (i.e., a strain of 3) to that predicted by linear viscoelasticity at the same temperature and time of 2 or greater. Ethylene-butene prepared by anionic polymerization and hydrogenation illustrate and ethylene-hexene copolymers prepared by coordination polymerization illustrate the invention. The invention polymers exhibit improved processing characteristics in that the shear thinning behavior closely approaches that of ideal polymers and exhibit improved strain thickening.

7 Claims, 3 Drawing Sheets

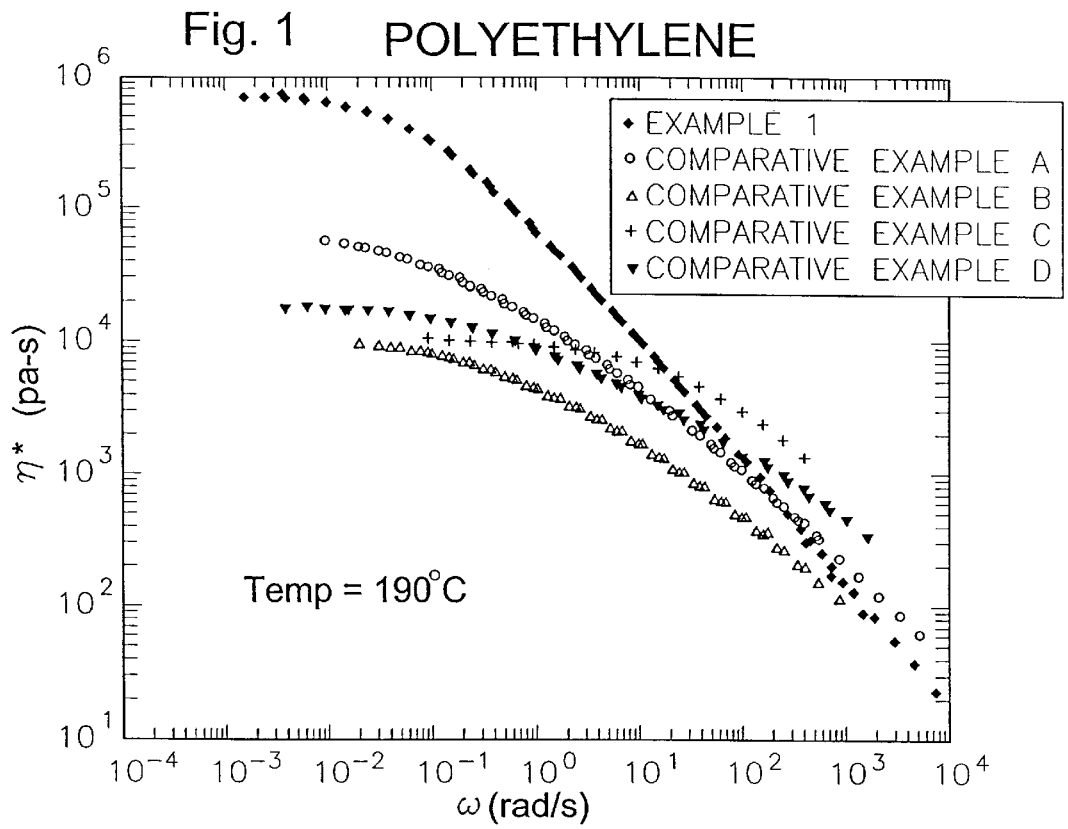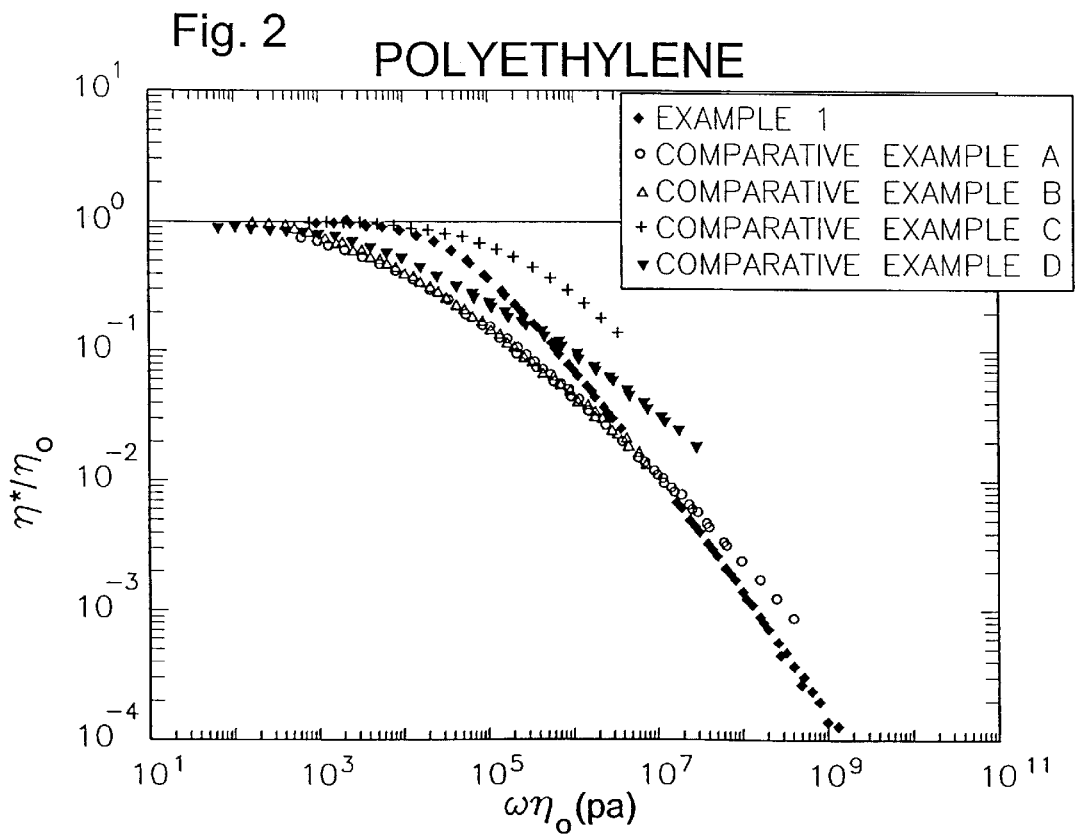

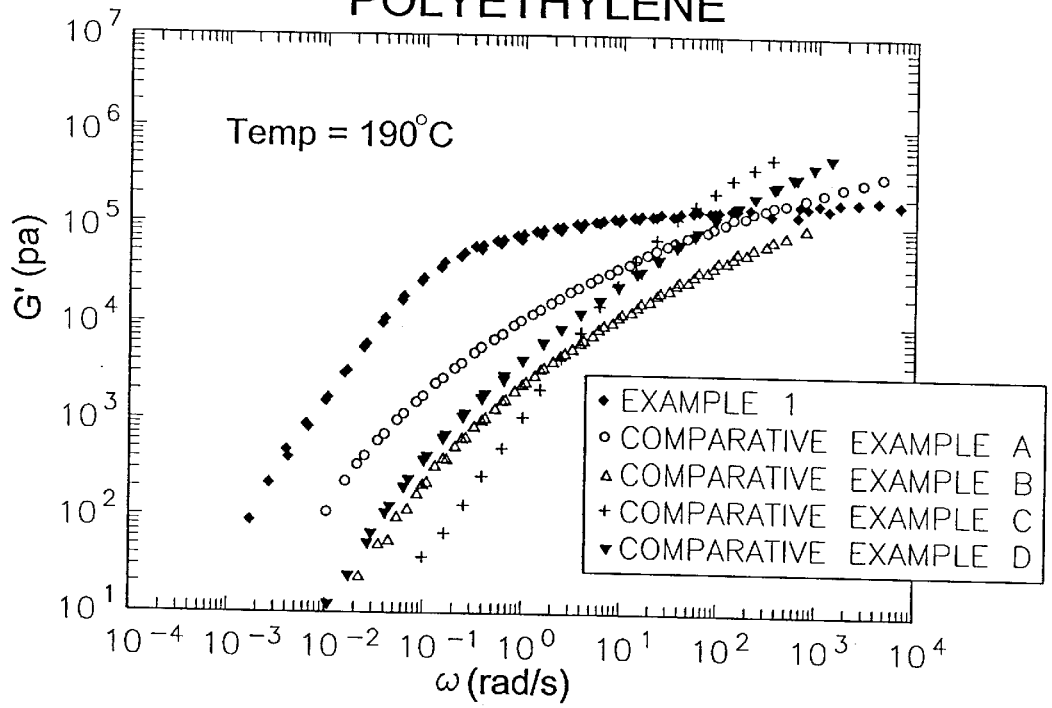
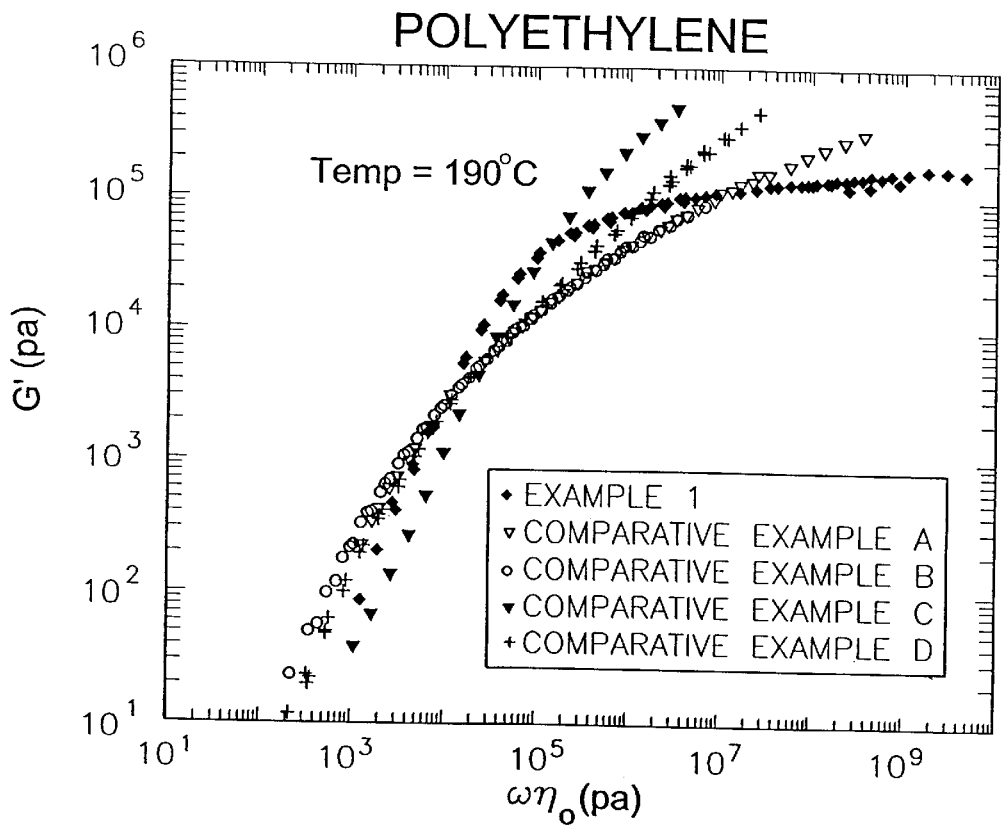

PROCESSING OLEFIN COPOLYMERS

This application claims benefit of provisional application No. 60/037,149 filed Feb. 14, 1997.

This application is a Divisional of U.S. application Ser. No. 09/020,270, filed Feb. 6, 1998, (Allowed), and this application is also a Divisional of U.S. application Ser. No. 09/939,269, filed Aug. 23, 2001 (copending).

TECHNICAL FIELD

The invention relates to improved processing olefin copolymers having a plurality of substantially linear branches and to compositions comprising them.

BACKGROUND OF THE INVENTION

Ethylene copolymers are a well-known class of olefin copolymers from which various plastic products are now produced. Such products include films, fibers, and such thermomolded articles as containers and coatings. The polymers used to prepare these articles are prepared from ethylene, optionally with one or more additional copolymerizable monomers. Low density polyethylene ("LDPE") as produced by free radical polymerization consists of highly branched polymers where the branches occur randomly throughout the polymer, that is on any number of formed segments or branches. The structure exhibited easy processing, that is polymers with it could be melt processed in high volumes at low energy input. Machinery for conducting this melt processing, for example extruders and film dies of various configurations, was designed into product finishing manufacturing processes with optimal design features based on the processing characteristics of the LDPE.

However, with the advent of effective coordination catalysis of ethylene copolymers, the degree of branching was significantly decreased, both for the now traditional Ziegler-Natta ethylene copolymers and those from the newer metallocene catalyzed ethylene copolymers. Both, particularly the metallocene copolymers, are essentially linear polymers, which are more difficult to melt process when the molecular weight distribution (MWD=$M_w/M_n$, where $M_w$ is weight-average molecular weight and $M_n$ is number-average molecular weight) is narrower than about 3.5. Thus broad MWD copolymers are more easily processed but can lack desirable solid state attributes otherwise available from the metallocene copolymers. Thus it has become desirable to develop effective and efficient methods of improving the melt processing of olefin copolymers while retaining desirable melt properties and end use characteristics.

The introduction of long chain branches into substantially linear olefin copolymers has been observed to improve processing characteristics of the polymers. Such has been done using metallocene polymers where significant numbers of olefinically unsaturated chain ends are produced during the polymerization reaction. See, e.g., U.S. Pat. No. 5,324,800. The olefinically unsaturated polymer chains can become "macromonomers" or "macromers" and, apparently, can be re-inserted with other copolymerizable monomers to form the branched copolymers. International publication WO 94/07930 addresses advantages of including long chain branches in polyethylene from incorporating vinyl-terminated macromers into polyethylene chains where the macromers have critical molecular weights greater than 3,800, or, in other words contain 250 or more carbon atoms. Conditions said to favor the formation of vinyl terminated polymers are high temperatures, no comonomer, no transfer agents, and a non-solution process or a dispersion using an alkane diluent. Increase of temperature during polymerization is also said to yield β-hydride eliminated product, for example while adding ethylene so as to form an ethylene "end cap". This document goes on to describe a large class of both monocyclopentadienyl and biscyclopentadienyl metallocenes as suitable in accordance with the invention when activated by either alumoxanes or ionizing compounds providing stabilizing, noncoordinating anions.

U.S. Pat. Nos. 5,272,236 and 5,278,272 describe "substantially linear" ethylene polymers which are said to have up to about 3 long chain branches per 1000 carbon atoms. These polymers are described as being prepared with certain monocyclopentadienyl transition metal olefin polymerization catalysts, such as those described in U.S. Pat. No. 5,026,798. The copolymer is said to be useful for a variety of fabricated articles and as a component in blends with other polymers. EP-A-0 659 773 A1 describes a gas phase process using metallocene catalysts said to be suitable for producing polyethylene with up to 3 long chain branches per 1000 carbon atoms in the main chain, the branches having greater than 18 carbon atoms.

Reduced melt viscosity polymers are addressed in U.S. Pat. Nos. 5,206,303 and 5,294,678. "Brush" polymer architecture is described where the branched copolymers have side chains that are of molecular weights that inhibit entanglement of the backbone chain. These branch weight-average molecular weights are described to be from 0.02–2.0 $M_e^B$, where $M_e^B$ is the entanglement molecular weight of the side branches. Though the polymers illustrated are isobutylene-styrene copolymers, calculated entanglement molecular weights for ethylene polymers and ethylene-propylene copolymers of 1,250 and 1,660 are provided. Comb-like polymers of ethylene and longer alpha-olefins, having from 10 to 100 carbon atoms, are described in U.S. Pat. No. 5,475,075. The polymers are prepared by copolymerizing ethylene and the longer alpha-olefins which form the side branches. Improvements in end-use properties, such as for films and adhesive compositions are taught.

DISCLOSURE OF INVENTION

The invention is directed to a polymer composition comprising essentially saturated hydrocarbon polymers having: A) a backbone chain; B) a plurality of essentially hydrocarbon sidechains connected to A), said sidechains each having a number-average molecular weight of from 2,500 Daltons to 125,000 Daltons and an MWD by SEC of 1.0–3.5; and, C) a mass ratio of sidechains molecular mass to backbone molecular mass of from 0.01:1 to 100:1. These invention compositions comprise essentially saturated hydrocarbon polymers having: A) a Newtonian limiting viscosity ($\eta_0$) at 190° C. at least 50% greater than that of a linear olefinic polymer of the same chemical composition and weight average molecular weight, preferably at least twice as great as that of said linear polymer, B) a ratio of the rubbery plateau modulus at 190° C. to that of a linear polymer of the same chemical composition less than 0.5, preferably <0.3, C) a ratio of the Newtonian limiting viscosity ($\eta_0$) to the absolute value of the complex viscosity in oscillatory shear ($\eta^*$) at 100 rad/sec at 190° C. of at least 5, and D) a ratio of the extensional viscosity measured at a strain rate of 1 sec$^{-1}$, 190° C., and time=3 sec (i.e., a strain of 3) to that predicted by linear viscoelasticity at the same temperature and time of 2 or greater. The invention polymers exhibit highly improved processing properties, improved shear thinning properties and melt strength.

BRIEF DESCRIPTION OF DRAWINGS

FIGS. I–IV illustrate viscometric data of an ethylene-butene copolymer of the invention in comparison with similarly obtained data for traditional low density polyethylene (LDPE) and metallocene low density polyethylenes (LLDPE).

FIG. 1 illustrates the complex viscosity vs. the frequency of oscillatory deformation at 190° C.

FIG. 2 illustrates the normalized viscosity vs. the frequency times the zero shear viscosity at 190° C.

FIG. 3 illustrates the storage modulus vs. the frequency at 190° C.

FIG. 4 illustrates the storage modulus vs. the frequency times the zero shear viscosity at 190° C.

DETAILED DESCRIPTION OF THE INVENTION

Figure 5:
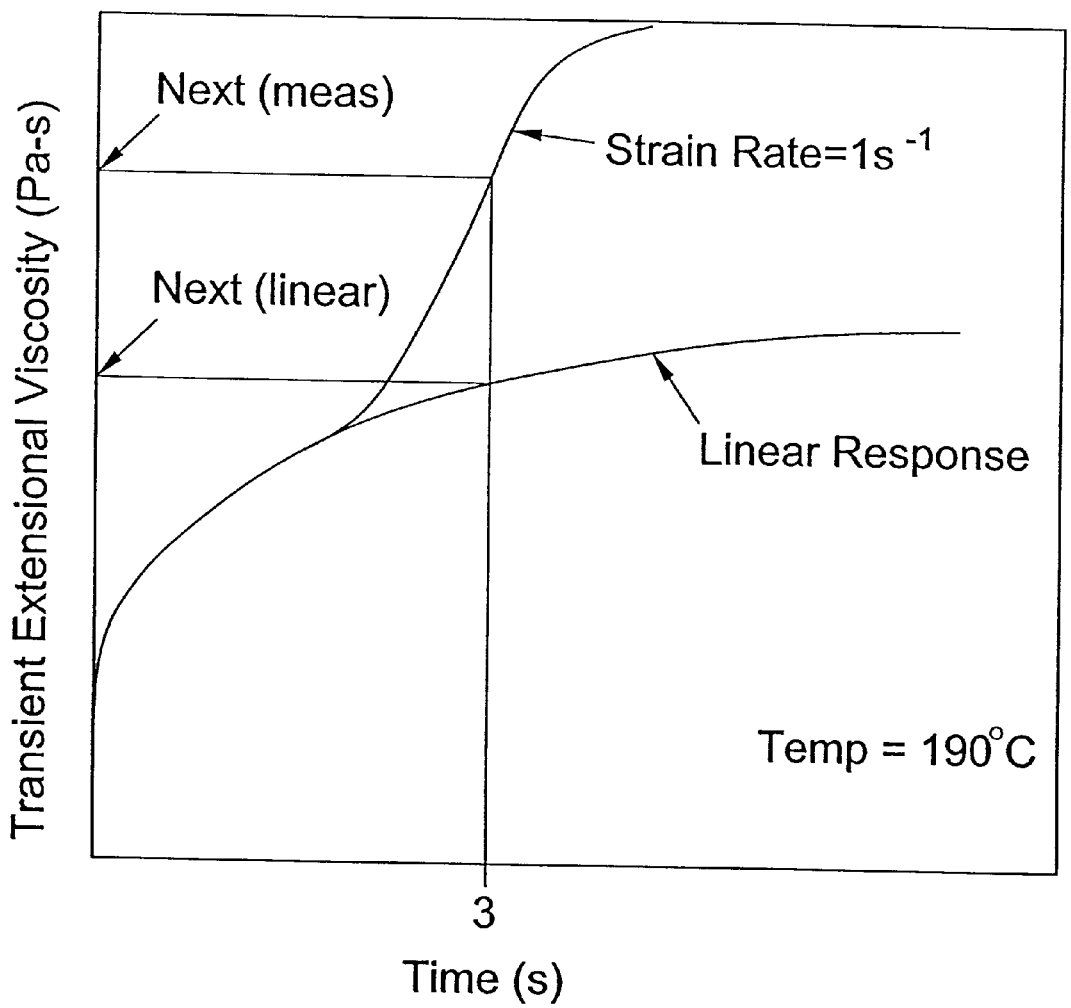
FIG. 5 illustrates the relation between the extensional viscosity ($\eta_{ext}$ (linear)) and that measured ($\eta_{ext}$ (meas)) for a polymer that shows significant strain hardening.

The branched hydrocarbon copolymers according to the invention can be described as those having a main, or backbone chain, of ethylene and other insertion copolymerizable monomers, containing randomly distributed side chains of ethylene and other insertion copolymerizable monomers. The backbone chain has a weight-average molecular weight from about 5,000 to about 1,000,000 Daltons, preferably from about 10,000 to about 500,000 Daltons, most preferably from about 20,000 to about 200,000 Daltons. The side chains have weight-average molecular weights from about 2,500 to about 125,000 Daltons, preferably from about 3,000 to about 80,000 Daltons, most preferably from about 4,000 to about 60,000 Daltons. As expressed in $M_e^B$, side chains have weight-average molecular weights ranging from above 2 to 100 times the entanglement weight of copolymer, preferably 3–70 times the entanglement weight of copolymer, and most preferably 4–50 times the entanglement weight of copolymer. The number of side chains per backbone chain is determined by the average spacing between the branches, the backbone segment between each branch averaging a weight average of at least twice the entanglement molecular weight of polyethylene, preferably 3 to 25 times the entanglement molecular weight of polyethylene. In practice this establishes a number of arms of from 2–100, preferably 2–70, most preferably 3–50.

The MWD, defined as the ratio of weight-average molecular weight to number-average molecular weight, for both the backbone chain and the sidechains, independently, can be from 1.0–6, preferably 1–5, and most preferably 1–3.5.

Rheological Properties

Definition of linear viscoelastic behavior of polymeric materials is complex, but utilizes well known concepts. Thus, the invention may be described in terms of melt rheological parameters including the Newtonian limiting viscosity, the rubbery plateau modulus, and in terms of "shear thinning" characteristics readily quantified in terms of the ratio of the Newtonian limiting viscosity ($\eta_0$) to the absolute value of the complex viscosity in oscillatory shear ($\eta^*$) at 100 rad/sec at 190° C. Shear thinning may be characterized by the ratio of the Newtonian viscosity ($\eta_0$) to viscosity the complex viscosity at an arbitrarily chosen frequency of 100 rad/sec ($\eta^*_{100}$). This $\eta_0$ may be measured in various ways well known to those skilled in the art. Included among these are rotational oscillatory shear rheometry and rotational steady shear rheometry, including shear creep. The value of $\eta_0$ may be obtained from these methods by direct observation of the frequency independent or shear rate independent value of viscosity, or it may be determined from an appropriate fitting equation such as the Cross equation when the data extend into the Newtonian region. Alternative data handling methods included evaluating the limiting value of the ratio of the loss modulus to frequency, $G''/\omega$, at low frequency:

$$\eta_0 = \lim G''/\omega|_{\omega \to 0},$$

or by linearly extrapolating the reciprocal of viscosity vs. shear stress to zero shear stress (e.g., G. V. Vinogradov, A. Ya. Malkin, Rheology of Polymers, Mir Publications Moscow, Springer-Verlag, p. 153 (1980)). Direct observation of the frequency independent value of the complex viscosity, $\eta^*$, from rotational oscillatory shear and/or the fitting of the Cross equation to the same data were the methods used for this description.

At low frequencies the melt viscosity expressed as the absolute value of the complex viscosity ($\eta^*$) of high polymers is independent of the frequency, i.e., it is constant with frequency and is called the Newtonian limiting viscosity, $\eta_0$. At increasing frequencies $\eta^*$ decreases with increasing frequency in a manner determined by its relaxation spectrum and this decrease in viscosity is called shear thinning (or, pseudoplasticity in earlier nomenclature). The plateau modulus may be defined in several interrelated ways, e.g., the value of the storage modulus (real part of the complex modulus), $G'$, in a region of $G'$ constant with frequency, or the value of $G'$ at the frequency of a minimum in the loss modulus (imaginary part of the complex modulus), $G''$, or the value of $G'$ at the minimum in $\tan \delta$, where $\tan \delta = G''/G'$, or other definitions which lead to similar answers. For purposes of the description we chose to use the ratio of the Newtonian viscosity to the complex viscosity as discussed above.

Definitions and description of these and other parameters discussed here may be found, e.g., in Ferry (J. D. Ferry, *Viscoelastic Properties of Polymers*, 3rd Ed., John Wiley & Sons, N.Y., 1980) and in Dealy and Wissbrun (J. M. Dealy, K. F. Wissbrun, *Melt Rheology and Its Role in Plastics Processing, Theory and Applications*, Van Nostrand Reinhold, N.Y., 1990). The methods of measurement, e.g., rotational oscillatory shear between parallel circular plates in an instrument such as a Rheometrics Scientific Mechanical Spectrometer, and data treatment, e.g., interconversion of complex variable rheological parameters and time-temperature superposition, are also well known and frequently used by those of ordinary skill in the art. Again, these are largely described in the above references and in numerous other texts and peer-reviewed publications in the field.

The ability of a polymer to exhibit strain hardening under extension (i.e., or increase of the extensional viscosity with strain rate) has been shown to correlate with the melt strength of that polymer and the ease of forming a bubble from it as in blown film operations in industry. A measure of the strain hardening can be given as follows. One can predict what the extensional viscosity would be if the polymer obeyed linear viscoelasticity through the model of Chang and Lodge (Chang, H.; and Lodge, A. S.; Rheologica Acta, 11, pp. 127–129 (1972)). This is shown in the FIG. V as $\eta_{ext}$(linear). This can be compared to the experimentally measured viscosity, called $\eta_{ext}$ (measured) in the figure. The sharp rise of $\eta_{ext}$ (measured) over the predicted value $\eta_{ext}$(linear) is the result of strain hardening. To extract a number from the data that expresses the degree of this strain hardening, we selected the value of $\eta_{ext}$ (measured) at conditions characteristic of film blowing—a strain rate of 1 sec$^{-1}$, temperature of 190° C., and time of 3 sec. The ratio then becomes the measured value divided by that predicted by the Chang and Lodge model at the same temperature and time. This ratio must be greater than 2 for clear evidence of strain hardening, so it can be represented as the following:

$$\eta_{ext} \text{ (measured)}/\eta_{ext}(\text{linear}) \equiv \eta_{ext} \text{ ratio} \geq 2.$$

Polymer melt elongation (or extension) is another important deformation in polymer processing. It is the dominant deformation in film blowing, blow molding, melt spinning, and in the biaxial stretching of extruded sheets. Often, an extensional deformation producing molecular orientations takes place immediately before solidification resulting in anisotropy of the end-use properties. Extensional rheometry data are very sensitive to the molecular structure of a polymer system therefore, these data is a valuable tool for polymer characterization.

The time dependent uniaxial extensional viscosity was measured with a Rheometrics Scientific Melt Elongational Rheometer (RME). The RME is an elongational rheometer for high elongations of polymer melts. The sample is supported by an inert gas, heated to the test temperature by electrical heaters mounted in the side plates of the rheometer. The temperature is controlled from ambient to 350° C. The polymer melt sample is extended homogeneously by two metal belt clamps, each consisting of two metal belts with its fixtures. The metal belts control a range of extensional strain rates from 0.0001 to 1.0 s$^{-1}$. The forces generated by the sample are measured by a spring type transducer with a range from 0.001 to 2.0 N. The maximum Hencky strain achievable by this instrument is 7 (stretch ratio=1100). This instrument is based upon a published design, see Meissner, J., and J. Hostettler, Rheological Acta, 33, 1–21 (1994), and is available from Rheometrics Scientific, Inc.

The rheological behavior of these polymers with controlled branching shows surprising and useful features. These polymers have a zero-shear viscosity that is larger than a linear polymer of the same molecular weight. They show a rapid drop in viscosity with shear rate (large degree of shear thinning); and a plateau modulus that is at least two times lower than that of prior art linear and branched polymers. This latter characteristic is, especially surprising, since ethylene polymers of various types exhibit essentially the same plateau modulus. This was thought to be intrinsic to the monomer type and not dependent on polymer architecture. The lower plateau modulus means that the comb polymers likely are much less entangled than the linears, thus giving it such low viscosity for their molecular weight. The utility of these properties of the invention polymers is that they have a very low viscosity for its molecular weights under melt processing conditions and so will process much more easily than the prior art polymers while exhibiting increased extensional viscosity indicative of increased melt strength.

Polymer Preparation

Initial studies conducted to determine optimum polymer structures suitable for the improved properties sought were based on knowledge as to production of hydrocarbon polymers with precisely controlled structures through the saturation of anionically synthesized polydienes. Various polydienes can be saturated to give structures that are identical to polyolefins as was reported by Rachapudy, H.; Smith, G. G.; Raju, V. R.; Graessley, W. W.; *J. Polym. Sci.—Phys.* 1979, 17, 1211. The techniques completely saturate the polydiene without any side reactions that might degrade or crosslink the molecules. The controlled molecular weight and structure available from anionic polymerization of conjugated dienes are thus preserved. A unit of butadiene that has been incorporated 1, 4 into the polybutadiene chain will have the structure of two ethylenes (four methylenes) after saturation, and those that go in as 1, 2 will be like one butene unit. So the saturated versions of polybutadienes of a range of microstructures are identical in structure to a series of ethylene-butene copolymers. Similarly saturated polyisoprenes resemble an alternating ethylene-propylene copolymer, and other polydienes can give the structures of polypropylene and other polyolefins upon saturation. A wide variety of saturated hydrocarbon polymers can be made in this way.

Thus linear ethylene-butene copolymers can be made by the saturation of linear polybutadienes and linear ethylene-propylene copolymers of the invention can be made by the saturation of linear polyisoprenes. The linear polymers can be prepared by anionic synthesis on a vacuum line in accordance with the teachings of Morton, M.; Fetters, L. J.; *Rubber Chem. & Technol.* 1975, 48, 359. The polymers of the invention made in this manner were prepared in cyclohexane at ~0° C., with butyllithium as initiator. The polydiene polymers were then saturated under H$_2$ pressure using a Pd/CaCO$_3$ catalyst of *J. Polym. Sci.—Phys.* 1979, 17, 1211, above. This technique can be used to make polymers over a wide range of molecular weights, e.g. polymers with molecular weights from 3,500 to 800,000.

The branched polymers of the invention can be made by attaching one or more linear polymers, prepared as above, as branches to another of the linear polymers serving as a backbone or main chain polymer. The general method is to produce branch or arm linear polymers by the procedure above, using the butyllithium initiator; this produces a polybutadiene with a lithium ion at the terminal end. A linear backbone is made in the manner described above, some number of the pendant vinyl double bonds on the backbone polymers are then reacted with (CH$_3$)$_2$SiClH using a platinum divinyl tetramethyl disiloxane catalyst. The lithium ends of the arm polybutadiene polymers then are reacted with the remaining chlorines on the backbone polybutadiene vinyls, attaching the arms. Because both the placement of the vinyl groups in the backbone and the hydrosilylation reaction are random, so is the distribution of arms along and among the backbone molecules. These polybutadiene combs can be saturated as shown above to form ethylene-butene copolymer combs with nearly monodisperse branches randomly placed on a nearly monodisperse backbone. Polymers having two branches can be made by a similar synthetic procedure. Four anionically synthesized polymers (arms) are attached to the ends of a separately synthesized polymer ("connector"), two at each end. This results in an H-shaped structure, i.e., a symmetric placement of the arms and non-random distribution of the of arms of the molecule.

An alternate method of preparing the branched olefin copolymers of the invention, particularly ethylene copolymers, is by preparing olefinically unsaturated macromers having molecular weight attributes within that described for the branch or arm polymers or copolymers and incorporating those into a branched polymer by copolymerization. Such can be done, for example, by preparing branch macromers from olefins such that there is vinyl or vinylidene unsaturation at or near the macromer chain end. Such is known in the art and the teachings of the background art as to the use of metallocenes to prepare these macromers, and then to insert or incorporate the macromers into a forming polymer as long chain branches, are applicable in this regard. Each of U.S. Pat. No. 5,324,800 and international publication WO 94/07930 are incorporated by reference for purposes of U.S. patent practice. Such can be accomplished by the use of series reactions or in situ single processes where the selection of catalyst or catalyst mix allows for the preparation of olefinically unsaturated macromers and subsequent incorporation of them into forming polymeric chains.

In order to assure the quality and number of branches sought, it is suitable to use a multistep reaction process wherein one or more branch macromers are prepared and subsequently introduced into a reaction medium with a catalyst capable of coordination copolymerization of both the macromer and other coordination polymerizable monomers. The macromer preparation preferably is conducted so as to prepare narrow MWD macromers, e.g., 2.0–3.5, or even lower when polymerization conditions and catalyst selection permit. The comonomer distribution can be either narrow or broad, or the macromer can be a homopolymeric macromer. The use of essentially single site catalysts, such as metallocene catalysts, permits of the sought narrow MWD. Branch separation, or stated alternatively, branch numbers by molecular weight of the backbone chain, is typically controlled by assuring that the reactivity ratios of the macromers to the copolymerizable monomers is in a ratio that allows the preferred ranges for the branch structure as described above. Such can be determined empirically within the skill in the art. Factors to be adjusted include: catalyst selection, temperature, pressure, and time of reaction, and reactant concentrations, all as is well-known in the art.

In this manner, branched copolymers are made directly without hydrogenation and the selection of comonomers is extended to the full extent allowed by insertion or coordination polymerization. Useful comonomers include ethylene, propylene, 1-butene, isobutylene, 1-hexene, 1-octene, and higher alpha-olefins; styrene, cyclopentene, norbornene, and higher carbon number cyclic olefins; alkyl-substituted styrene or ; alkyl-substituted norbornene; ethylidene norbornene, vinyl norbornene, 1,4-hexadiene, and other non-conjugated diolefins. Such monomers can be homopolymerized or copolymerized, with two or more copolymerizable monomers, into either or both of the branch macromers or backbone chains along with the macromers. The teachings of co-pending U.S. provisional patent application 60/037323 filed Feb. 7, 1997, is incorporated by reference for purposes of U.S. patent practice. See also the examples below where a mixed zirconocene catalyst was used in a fluidzed gas phase polymerization of an ethylene-hexene copolymer product which contained component copolymer fractions meeting the limiting elements of the invention described herein.

Industrial Applicability

The branched polyethylene copolymers according to the invention will have utility both as neat polymers and as a portion or fraction of ethylene copolymer blend compositions. As neat polymers, the polymers have utility as film polymers or as adhesive components, the discussion of WO 94/07930 being illustrative. The fabricated articles of U.S. Pat. Nos. 5,272,236 and 5,278,272 are additionally illustrative.

The copolymers of the invention will also have utility in blends, those blends comprising the branched copolymer of the invention at from 0.1–99.9 wt. %, preferably from 0.3–50 wt. %, more preferably 0.5–25 wt. %, and even more preferably 1.0–5 wt %, the remainder comprising an essentially linear ethylene copolymer of weight-average molecular weight from about 25,000 Daltons to about 500,000 Daltons, typically those having an MWD of from about 1.75–30, preferably 1.75–8.0, and more preferably 1.9–4.0, with densities form 0.85 to 0.96, preferably 0.85 to 0.93, as exemplified by the commercial polymers used for comparison in this application. The blends in accordance with the invention may additionally comprise conventional additives or adjuvants in conventional amounts for conventional purposes. The blends according to the invention exhibit improved processing, largely due to the inclusion of the branched ethylene copolymer according to the invention, and can be more easily processed in conventional equipment.

EXAMPLES

Example 1

Preparation of C1

A comb polybutadiene polymer (PBd) was prepared by coupling hydrosilylated polybutadiene backbone chains with polybuatadienyllithium sidechains, or branches. The polybutadiene which was used as backbone for the hydrosilylation reaction was prepared by anionic polymerization using high vacuum techniques, with sec-BuLi in benzene at room temperature. (Characterization: $M_n$=106,500 by size exclusion chromatography (SEC) based upon a polybutadiene standard; 10% 1,2 units). 10 grams of this backbone polymer chain were dissolved in 120 ml tetrahydrofuran (THF) in an one-liter round bottom flask equipped with a good condenser, to which 3 drops of platinum divinyl tetramethyl disiloxane complex in xylene (catalyst, Petrarch PC072) were added. The solution was dried overnight with 1.5 ml trimethylchlorosilane, followed by the addition of 7.55 mmole dimethylchlorosilane. The mixture's temperature was raised slowly to 70° C. Changing of the color, vigorous boiling and refluxing indicated the start of the reaction which was continued for 24 hours at 70° C. THF and chlorosilane compounds were removed in the vacuum line by heating the polymer at 45° C. for 5 days. The hydrosilylated polymer was freeze dried under high vacuum for 2 days.

Living polybutadiene branch polymers (PBdLi, $M_n$=6, 400 by SEC; T3) used for the coupling reaction was prepared in the same manner as the backbone. The synthesis of PBdLi was performed by reacting 12.75 grams of butadiene monomer with 2.550 mmoles of initiator. Prior to the coupling reaction 1 gram of PBdLi was removed, terminated with methanol and used for characterization. 40% excess of PBdLi was used for the coupling reaction, which was monitored by SEC and allowed to proceed for 2 weeks. Excess PBdLi was terminated with methanol. The comb polymer was protected against oxidation by 2,6-di-tert-butyl-p-cresol and was fractionated in a toluene-methanol system. Fractionation was performed until no arm or undesirable products were shown to be present by SEC. The comb was finally precipitated in methanol containing antioxidant, dried and stored under vacuum in the dark. Characterization, which was carried out by SEC, membrane osmometry (MO), vapor pressure osmometry (VPO), low-angle laser light scattering (LALLS), and laser differential refractometry, indicated the high degree of molecular and compositional homogeneity. Molecular characterization results are shown in Table I. Using the $M_n$ (MO, VPO) and $M_w$ (LALLS) of Table I the number of arms experimentally obtained is calculated, which is smaller than the theoretically expected, indicating a small yield in the hydrosilylation reaction. Fractionation and characterization results are shown in Table I and II.

The number of branches, or sidechains, was determined by both $^{13}$C-NMR and $^1$H-NMR. Resonances characteristic of methyl groups adjacent to a Si atom (at the point of connection to the backbone) was found from both methods: similarly, resonances characteristic of the methyl adjacent of the methine in a sec-butyl group (at the terminus of the arm from the initiator used to polymerize it) was measured. From the combination of these methods, the number of arms per 10,000 carbons was found to be 15±5, which is consistent with 34 arms for this example.

The resulting comb (branched polybutadiene polymer) ("C1") was saturated catalytically. 3 grams of the comb polymer were dissolved in cyclohexane and reacted with $H_2$ gas at 90° C. and 700 psi in the presence of 3 g of a catalyst made by supporting Pd on CaCO3. The reaction was allowed to proceed until the $H_2$ pressure stopped dropping, or about 24 h. The polymer solution was then filtered to remove the catalyst residues. The saturation of the polymer was seen to be greater than 99.5% by proton NMR. The polymer was thus converted by hydrogenation to an ethylene-butene branched copolymer. See Tables I and II, below.

Example 2

Preparation of C2

8 grams of PBd ($M_n$=87,000 by MO, prepared as described in Example 1; $BB_3$) dissolved in 150 ml THF were hydrosilylated in the same manner as described in Example 1, using 0.5 ml of trimethylchlorosilane and 2.43 mmoles of dimethylchlorosilane. The hydrosilylated polymer was freeze dried under high vacuum for 5 days. PBdLi ($M_n$=4, 500 by VPO; $T_5$) was prepared as described in Example 1 by reacting 11.5 grams of butadiene with 2.550 mmoles of initiator. 1 gram of $T_5$ was removed in order to be used for characterization purposes. The coupling reaction was accomplished as described in Example 1. Fractionation and characterization results are shown in Table I and Table II.

The resulting comb PBd (C2) was saturated catalytically as in Example 3. The saturation of the polymer was seen to be greater than 99.5% by proton NMR. The resulting saturated polymer had an $M_w$ of 97,000 by LALLS.

Example 3

Preparation of C3

2 grams of PBd ($M_n$=108,000 by SEC, prepared as described in Example 1; $BB_4$) dissolved in 50 ml THF were hydrosilylated in the same manner as described in Example 1, using 0.5 ml of trimethylchlorosilane and 0.77 mmoles of dimethylchlorosilane. The hydrosilylated polymer was freeze dried under high vacuum for 2 days. PBdLi ($M_n$=23, 000 by SEC; $T_6$) was prepared as described in Example 1 by reacting 22 grams of butadiene with 0.936 mmoles of initiator. 1 gram of $T_6$ was removed in order to be used for characterization purposes. The coupling reaction was accomplished as described in Example 2. Fractionation and characterization results are shown in Table I and Table II.

The resulting comb PBd (C3) was saturated catalytically as in Example 3. The saturation of the polymer was seen to be greater than 99.5% by proton NMR. The resulting saturated polymer had an $M_w$ of 598,000 by LALLS.

Example 4

Preparation of C4

6 grams of PBd ($M_n$=100,000 by SEC, prepared as described in Example 1; $BB_5$) dissolved in 60 ml THF were hydrosilylated in the same manner as described in Example 1, using 1.0 ml of trimethylchlorosilane and 3.83 mmoles of dimethylchlorosilane. The hydrosilylated polymer was freeze dried under high vacuum for 2 days. PBdLi ($M_n$=5, 100 by SEC; $T_7$) was prepared as described in Example 1 by reacting 27 grams of butadiene with 5.370 mmoles of initiator. 1 gram of $T_7$ was removed in order to be used for characterization purposes. The coupling reaction was accomplished as described in Example 2. Fractionation and characterization results are shown in Table I and Table II.

The resulting comb PBd (C4) was saturated catalytically as in Example 3. The saturation of the polymer was seen to be greater than 99.5% by proton NMR.

TABLE I

Molecular characteristics of precursors and final polymers.

| Part | Sample | $10^{-3}$ $M_n$ (SEC)[a] | $10^{-3}$ $M_n$ (MO)[b] | $10^{-3}$ $M_w$ (LALLS)[c] | $10^{-3}$ $M_w$ (VPO)[d] | $M_w/M_n$ |
|---|---|---|---|---|---|---|
| Backbone | $BB_2$ | 106.5 | 101 | 103 | — | 1.05 |
| Arm | $T_3$ | 6.4 | — | — | 6.5 | 1.03 |
| Comb | C1 | — | 274 | — | — | 1.07 |
| Backbone | $BB_3$ | 99.0 | 87 | 90.0 | — | 1.04 |
| Arm | $T_5$ | 4.8 | — | — | 4.5 | 1.05 |
| Comb | C2 | — | 105.5 | 107 | — | 1.08 |
| Backbone | $BB_4$ | 108 | 97 | 104 | — | 1.05 |
| Arm | $T_6$ | 23 | — | 23.5 | — | 1.04 |
| Comb | C3 | — | — | 612 | — | 1.07 |
| Backbone | $BB_5$ | 100 | 100.5 | — | — | 1.04 |
| Arm | $T_7$ | 5.1 | — | — | 4.75 | 1.04 |
| Comb | C4 | — | 194 | 198 | — | 1.04 |

[a]THF at 30° C., Phenomenex columns (Type P Phenogel 5 linear, pore size: 50 to $10^6$ Å).
[b]Toluene at 35° C., Model 231, Wescan.
[c]Cyclohexane at 30° C., KMX-6, Chromatix.
[d]Toluene at 50° C., Model 833, Jupiter Instrument Company.

TABLE II

Number of arms

| Comb | Maximum possible[a] | Calculated[b] | Measured[d] | Yield (%) |
|---|---|---|---|---|
| C1 | 100 | 29[c] | 34 | 29–34 |
| C2 | — | 3.9 | 2.4 | — |
| C3 | — | 22[c] | — | — |
| C4 | — | 19[c] | — | — |

[a]From total number of pendant vinyl groups.
[b]Calculated from $M_n$ by MO and VPO.
[c]Calculated from $M_w$ by LALLS.
[d]Measured by $^{13}$C-NMR.

Example 5

Preparation of Blend 1

Blend 1: 6.8685 g of EXCEED® 103 ("ECD103"), a commercially available ethylene-1-hexene linear low density polyethylene of Exxon Chemical Co. having a density of 0.917 and MI of 1.0, and 0.1405 g of C1 (above) were dissolved in 100 ml of xylene at 130° C. 0.0249 g of a stabilizer package (a 1:2 mixture of Irganox® 1076 and Irgafos®168 from Ciba-Geigy, Inc.) was also added. The solution was allowed to mix for 2 hours at 130° C., and then the polymer blend was precipitated by adding the xylene solution to 1800 ml of methanol chilled to 2° C. The precipitate was washed with more methanol, and the remaining xylene was removed by drying in a vacuum oven at 88° C. for two days.

Example 6

Preparation of Blend 2

Blend 2: 6.8607 g of the EXCEED® 103 (ECD103), 0.1402 g of C3 (above) and 0.0248 of the stabilizer package were mixed in the same manner as Blend 1.

H-shaped Polymer Examples

Example 7

Preparation of H1
Preparation of Arms:
6.3 ml (5.0 g) 1,3-butadiene was diluted in 75 ml benzene (6.1% w/v). To this solution was added 16.3 ml sec-BuLi 0.062M in n-hexane ($1.01 \times 10^{-3}$ mol sec-BuLi). After 24 h at room temperature the reaction was complete. 1.0 g of the product polybutadiene (Y; $M_n$=5,500 by SEC) in 18 ml solution was removed for the characterization procedure and the rest of Y was mixed with 8.3 ml $CH_3SiCl_3$ 0.046 M in benzene ($0.38 \times 10^{-4}$ mol $CH_3SiCl_3$). After 7 days at room temperature the reaction was complete and the $Y_2Si(CH_3)Cl$ was formed.
Preparation of Connector:
A difunctional initiator was prepared by the addition of sec-butyl lithium to 1,3-bis(1-phenyl ethenyl) benzene, resulting in 1,3-bis(1-phenyl-3 methyl pentyl lithium) benzene, called here DLI. 15.4 ml (11.4 g) 1,3-butadiene was diluted in 355 ml benzene (2.3% w/v). To this solution was added 33.8 ml of DLI 0.0225M in benzene ($7.3 \times 10^{-4}$ mol DLI) and 8.4 ml of sec-BuOLi 0.10M in benzene ($8.36 \times 10^{-4}$ mol sec-BuOLi). After 4 days at room temperature the reaction was complete. 1.0 g of the product difunctional polybutadiene (X; $M_n$=27,100 by SEC; $M_w$=24,500 by LALLS) in 35 ml solution was removed for the characterization procedure. 4.8 g of X in 175 ml solution was removed for the formation of the $Y_2Si(CH_3)X(CH_3)SiY_2$.
Formation of H1:
4.0 g of $Y_2Si(CH_3)Cl$ and 34.8 g of X were mixed. To the solution was added 1.0 ml THF. After 7 days at room temperature the formation of the H1 was complete. H1 comprised a structure having a backbone of about 38,000 $M_n$ plus tow Y arms and two brancheds each of about 5,500 $M_n$ (Y arms).
Fractionation:
The product of the previous reaction was precipitated in 1000 ml methanol and was redissolved in 900 ml toluene (1% w/v). 450 ml methanol was added and the solution was stirred at room temperature to reach the cloud-point. After that 20 more ml of methanol were added and the temperature was increased slowly, until the solution became clear. Then it was left to cool down and next day the separated part of the H1 was collected, as the lower phase in a two-phase system. To the upper phase was added 25 ml methanol, to reach again the cloud-point and then 20 ml more methanol. The temperature was increased slowly and after the clearance of the solution, it was left to cool down. The newly separated part of the H1 was mixed with the previous part from the first fractionation and it composed the final pure H1. By LALLS the H1 had an $M_w$ of 50,000.
Saturation:
The H1 was saturated in the same manner as in Example 3, except that 0.2 g of triphenyl phosphate and 0.0366 g of tris(triphenyl phosphine)rhodium(I)chloride were added to the reaction for every gram of polymer. Essentially complete saturation was achieved. The resulting saturated polymer had an $M_w$ of 48,000 by LALLS.

Example 8

Preparation of H2
Preparation of Arms:
9.0 ml (6.7 g) 1,3-butadiene was diluted in 65 ml benzene (10.3% w/v). To this solution was added 10.7 ml sec-BuLi 0.062M in n-hexane ($6.66 \times 10^{-4}$ mol sec-BuLi). After 24 h at room temperature the reaction was complete. 1.0 g of the product polybutadiene (Z; $M_n$=11,000 by SEC, $M_w$=10,800 by LALLS) in 13 ml solution was removed for the characterization procedure and the rest of Z was mixed with 5.8 ml of $CH_3SiCl_3$ 0.046M in benzene ($0.27 \times 10^{-3}$ mol $CH_3SiCl_3$). After 7 days at room temperature the reaction was complete and the $Z2Si(CH_3)Cl$ was formed.
Preparation of Connector:
3.4 g of X in 125 ml solution was removed for the formation of the $Z_2Si(CH_3)X(CH_3)SiZ_2$ (H2) in the manner of Example 7.
Formation of H2:
5.7 g of $Z_2Si(CH_3)Cl$ and 3.4 g of X were mixed. To the solution was added 1.0 ml THF. After 7 days at room temperature the formation of the H2 was complete. H2 had a resulting H-shaped structure like H1.
Fractionation:
The procedure followed was the same as in Example 7. The resulting polymer had an $M_w$ of 67,000 by LALLS.
Hydrogenation:
The procedure followed was the same as in Example 7. The resulting saturated polymer had an $M_w$ of 64,700 by LALLS.

Rheological Properties of Examples

The melt shear rheological behavior of the various resulting copolymer examples was measured by well known methodology, i.e., rotational sinusoidal oscillatory shear between parallel plates in a Rheometrics Scientific RMS-800 Mechanical Spectrometer. Frequency ranges of from 0.1 to 100 rad/sec or from 0.1 to ca. 250 rad/sec or from 0.1 to ca. 400 rad/sec or from 0.01 to 100 rad/sec or from 100 to 0.01 rad/sec were covered at a sequence of temperatures ranging from 120° C. to 250° C. and in some cases to as high as 330° C. Typically, the examples were tested at isothermal conditions from 0.1 to 100 rad/sec or to ca. 250 rad/sec at 120° C., 150° C., 170° C., 190° C., and 220° C., successively, and then from 0.01 to 100 rad/sec at 250° C., 280° C. or higher as necessary to access the terminal linear viscoelastic regime. Repeat testing was periodically performed on the same specimens at 150° C. (sometimes at 220° C.) to check reproducibility. All measurements were performed at strains within the linear viscoelastic regime, and either one or two specimens were used to cover all temperatures tested. The parallel plates were 25 mm in diameter and the gap between the plates (sample thickness) was precisely set at values from ca. 1.6 mm to 2.3 mm for different test specimens and temperatures. Use of successive temperature testing on single specimens requires compensation for tooling expansion with increasing set temperature in order to maintain constant gap distance at all temperatures. This was accomplished in all cases by raising the upper platen (plate) at each new increased temperature by the amount 0.0029 mm/° C. Additionally, in some cases sample expansion evidenced by normal stress increase was compensated by maintaining a constant (low) normal stress in the sample at the various temperatures. The above methods are all well known to practicing rheologists. All samples were stabilized by addition of 1%(wt) of a 1:2 mixture of Irganox® 1076/ Irgafos® 168 (Ciba-Geigy, Inc.) prior to compression molding test specimens in a Carver Laboratory Press.

The resultant linear viscoelastic data, which may be expressed in numerous ways, but here were expressed as complex viscosity, $\eta^*$, elastic storage modulus, G', loss modulus, G", and complex modulus, G*, were then superimposed to the 190° C. reference temperature by well known time-temperature superposition methodology, yielding master curves of the above parameters vs. frequency over up to seven orders of magnitude of frequency from the terminal regime through the rubbery plateau region (where possible). Superposition specifically was performed by vertical shifting of the $\log_{10}$ complex modulus according to the equation $$b_T = \rho_o T_o / \rho T$$

where $b_T$ is the vertical shift factor, $\rho$ is the melt density at temperature, T's are absolute temperatures in ° K, and the subscript, °, refers to the 190° C. reference temperature. Vertical shifting was followed by arbitrary horizontal shifting of $\log_{10}$ complex modulus along the $\log_{10}$ frequency axis to yield the horizontal shift factors, $a_T$, which were then fitted to an Arrhenius form equation to yield the energy of activation for viscous flow, $E_a$, where $E_a$ is derived from $$a_T = \exp[(E_a/R)(1/T - 1/T_o)]$$

and where $R = 1.987 \times 10^{-3}$ in kcal/mol ° K.

The following critical melt shear rheological attributes at 190° C., derived from the master curve data, describing aspects of the invention are given in Tables III and VI for each of the examples:

Newtonian viscosity, $\eta_o$, in Pa-s

Plateau modulus, $G_N^°$, in Pa (evaluated at the frequency of G"minimum)

Ratio of Newtonian value to viscosity at 100 rad/sec, $\eta_o/\eta^*(100_s^{-1})$, Ratio of the extensional viscosity measured at a strain rate of 1 sec$^{-1}$, 190° C., and time=3 sec (i.e., a strain of 3) to that predicted by linear viscoelasticity at the same temperature and time, and Energy of activation, $E_a$.

The high Newtonian viscosities of the invention indicate advantageously high extensional viscosities (at low strain rate). The low plateau moduli of the invention, as well as the measures of shear thinning, are indicative of low viscosity at, e.g., extrusion, blow molding, and injection molding shear rates.

Example 1-1 (C1)

C1 was ground into coarse powder and dry mixed with 1%(wt) of a 1:2 mixture of Irganox® 1076/Irgafos® 168 (Ciba-Geigy, Inc.). This material was then compression molded into 1 inch (25.4 mm) diameter×2 mm thickness disks in a Carver Laboratory Press (Fred S. Carver, Inc.) using a cavity of these dimensions and Teflon® coated aluminum sheet liners. Molding was performed at ca. 190° C. and 10,000 psi. The melt linear viscoelastic testing as a function of frequency was performed at the various temperatures given below on two such specimens in a Rheometrics Scientific RMS-800 Mechanical Spectrometer in parallel plate sinusoidal oscillatory shear mode. Plate diameters and specimen diameters at test conditions were 25 mm and gap setting (sample thickness) at the initial 150° C. was 1.865 mm. Measurements were made on a single specimen at 150° C. (0.1–251 rad/sec, 1.865 mm gap), 120° C. (0.1–251 rad/sec, 1.865 mm gap), 170° C. (0.1–251 rad/sec, 1.908 mm gap), 190° C. (0.1–158 rad/sec, 1.993 mm gap), and 220° C. (0.1–251 rad/sec, 2.071 mm gap). On a second specimen, measurements were then performed at 220° C. (0.1–251 rad/sec, 2.081 mm gap), 250° C. (0.01–100 rad/sec, 2.111 mm gap), and 220° C. (100–0.01 rad/sec, 2.081 mm gap). Maintaining the gap setting constant with increasing temperature at the lower temperatures was accomplished compensating for tooling thermal expansion/contraction as described in the general section above. The increased gap setting at higher temperatures compensated both for tooling dimension change and for sample expansion, where the latter was accomplished by maintaining a constant (low) normal stress on the sample.

The resultant melt rheological parametric data were expressed as described in the general section above and were superimposed to 190° C. reference temperature master curves covering seven decades of reduced frequency in the well known manner described above using IRIS computer software (IRIS version 2.5, IRIS Development, Amherst, Mass.). Specific values of the parameters, Newtonian viscosity, plateau modulus, ratio of the Newtonian viscosity to the viscosity at 100 rad/sec, and energy of activation for viscous flow, are given in Table III.

FIGS. 1–5 illustrate the surprising features of the C1 as compared to those of commercial low density and linear low density polyethylene polymers. G28

FIG. 1 shows that the invention C1 exhibited a stronger frequency dependence of the viscosity than any of the comparative examples A, B, C, and D. This translates into lower energy input per throughput unit for the invention polymer. Note, this plot is dependent on the temperature and molecular weight of the example polymers, in addition to MWD and molecular architecture.

FIG. 2 is a plot of these variables in a reduced variable manner that renders viscosity curves which are independent of the temperature and the magnitude of the molecular weight, hence the comparison was made on equal footing. The differences were only due to the MWD and the branching characteristics. Note that the reduced viscosities of the two LDPE examples (A & B) were on top of each other. As for FIG. 1 this plot clearly shows that for high throughputs, as desired in melt processing, the invention Example I exhibited lower values of the viscosity than any of the comparative examples (A, B, C, & D). This translates into lower energy requirements per throughput unit.

FIG. 3 shows that C1 exhibited a region over which G' was essentially frequency independent, which can be taken as the plateau modulus. The behavior of the storage modulus of the comparative examples showed each to increase with the frequency, even after the frequency at which the invention reached a plateau. As with FIG. 1 the effects of the molecular weight and temperature have not been removed.

FIG. 4 shows the storage modulus of the example polymers against the product of the zero shear viscosity and frequency, thus removing the effects of temperature and molecular weight. Accordingly this plot reflects only the influence of the MWD and branching characteristics on the behavior of the storage modulus. This plot unquestionably shows that the storage modulus of Example I reached the rubbery plateau region whereas the storage moduli of the comparative examples were still increasing with frequency.

Example 2-1 (C2)

A single test specimen of C2 was prepared with stabilization and compression molding as described in the general discussion above and tested at the sequence of temperatures, 150° C. (0.1–100 rad/sec, 1.221 mm gap) 120° C. (0.1–100 rad/sec, 1.221 mm gap), 170° C. (0.1–100 rad/sec, 1.221 mm gap), 190° C. (100–0.01 rad/sec, 1.221 mm gap), 220° C. (100–0.01 rad/sec, 1.221 mm gap), and 150° C. (0.1–100 rad/sec, 1.221 mm gap). The resultant melt rheological parametric data were expressed as described in the general section above and were superimposed to 190° C. reference temperature master curves covering six to seven decades of reduced frequency in the well known manner described above using IRIS computer software (IRIS version 2.5, IRIS Development, Amherst, Mass.). Specific values of the parameters, Newtonian viscosity, plateau modulus, ratio of the Newtonian viscosity to the viscosity at 100 rad/sec, and energy of activation for viscous flow, are given in Table III.

Example 3-1 (C3)

A single test specimen of C3 prepared as in Example 2-1 was tested at a sequence of temperatures ranging from 120° C. to 330° C. with repeat tests at 150° C. performed after the 250° C. and the 300° C. tests. The frequency ranges at the individual temperatures were as described in the general description of methodology above. The resultant melt rheological parametric data were expressed as described in the general section above and were superimposed to 190° C. reference temperature master curves covering seven to eight decades of reduced frequency by the methods described in Examples 1-1 and 2-1. Specific values of the parameters, Newtonian viscosity, plateau modulus, ratio of the Newtonian viscosity to the viscosity at 100 rad/sec, and energy of activation for viscous flow, are given in Table III.

Examples 4-1 Through 8-1 (C4, BLEND 1, BLEND 2, H1, H2)

Examples 4-1 through 8-1 were prepared and tested variously within the general methodology described in the above sections. The data from the various temperatures for each example were superimposed to 190° C. master curves as described in Example 1-1. Specific values of the parameters, Newtonian viscosity, plateau modulus, ratio of the Newtonian viscosity to the viscosity at 100 rad/sec, and energy of activation for viscous flow, are given in Table III. Where specific values are omitted, they could not be determined with reasonable certainty from the data.

Example 9-1 (ECD103) (Comparative)

Example 9-1 was linear polyethylene used in the blends, Examples 5-1 and 6-1. It was stabilized as described in the general method description and compression molded into a 2.5in.×2.5in.×2 mm plaque from which three 25 mm diameter×2 mm thickness disks were cut. Melt viscoelastic testing was performed on the first specimen from 0.1 to 400 rad/sec at the succession of temperatures, 130° C., 120° C., 115° C., 150° C. Subsequently tests were performed on separate specimens from 0.1 to 100 rad/sec at 170° C. and at 190° C. Data superposition to 190° C. master curves was performed as described in previous examples, and specific values of the parameters, Newtonian viscosity, plateau modulus, ratio of the Newtonian viscosity to the viscosity at 100 rad/sec, and energy of activation for viscous flow, are given in Table III. Where specific values are omitted, they could not be determined with reasonable certainty from the data.

Sample Preparation For Extensional Rheology

Samples identified in Tables III and VI were tested in a Rheometrics Polymer Melt Elongational Rheometer (RME) for the value of the $\eta_{ext}$ ratio. They prepared as rectangular parallelepipeds whose length, width and thickness are approximately 60, 8, and 1.5 mm, respectively. These samples were prepared by compression molding the polymer of interest within a brass mask.

The first step in the procedure used to mold these samples was to weigh out approximately 0.9 g of polymer, which was sufficient to completely fill the mask. When the bulk material was in pellet or powder form, the weighing process was straightforward. However, when the material to be tested was received in hard chunks, an Exacto knife was used to cut small pieces of polymer from the bulk until the aforementioned mass had been collected. The next step was to stabilize the polymer, which was only necessary for those materials that were not in pelletized form. This was accomplished by adding one weight percent IRGAFOS® 168 stabilizer (Ciba-Geigy, Inc.) to the weighed out polymer. The brass extrusion die was then filled with the stabilized polymer, and sandwiched between heated platens at 190° C. that are mounted on a hydraulic press (Carver Inc.) The purpose of the die is to mix the melted polymer so that the resulting test specimens are free of air bubbles and weld lines. The presence of either can cause the test specimen to break at lower total strains versus the case in which the polymer chains of the test specimen are fully entangled. Note that 1"×1"×¹⁄₁₆" sheets of mylar were used to cap the die in order to keep the polymer within the die from contacting and sticking to the platens.

Once the polymer had melted within the die, the bottom sheet of mylar was removed, and the plunger was placed into the hole of the die. The brass mask was then mounted onto the bottom platen, with a sheet of mylar (3"×2"×¹⁄₁₆") being placed between the mask and the platen. The die and plunger were then placed onto the brass mask, so that the hole of the die coincided with the geometric center of the mask slit. The polymer was then extruded into the mask by closing the platens of the press, which drove the plunger into the die. The mask and die were then removed from the press and allowed to cool to approximately 100° C. at which point the mask was separated from the die. Because the sample held within the mask is not dimensionally homogeneous after extrusion, it was remolded within the press at 190° C. and 2000 psi between two 4"×2"×¹⁄₁₆" mylar sheets. After applying heat to the sample and mask for approximately ten minutes, the power to the platen heaters was turned off, and the sample and mask were allowed to cool to room temperature (approximately 2 hours). It was necessary to slowly cool the polymer specimen in this way so that the molded sample was free of residual stresses. Finally, the specimen was carefully removed from the mask, its dimensions were measured, and it was tested within the RME.

Sample Testing in the Rheometrics Polymer Melt Elongational Rheometer (RME)

After allowing for the oven of the RME to heat up to the desired testing temperature, calibration of the force transducer was performed. This was accomplished with the rotary clamps (with stainless steel belts) installed, and the top clamp on the transducer side (right-hand side) of the oven in the lowered position. With no mass hanging from the transducer shaft and pulley located at the back of the oven, the force calibration window was brought up in the data acquisition software. After choosing the desired force scale, the force gain was set to unity, and offset values were input until the average force readout on the screen was zero. A mass corresponding to that chosen for the force scale was then attached to the transducer shaft and hung over the pulley. The gain in the calibration window was then adjusted until the average measured force was equal to the mass attached to the transducer. Once this was accomplished, the mass was removed from the shaft/pulley and the offset in the force calibration window was adjusted until me average measured force was again zero. The mass was then re-attached and the gain was readjusted until the proper force readout was achieved. This procedure of zeroing and scaling the transducer readout was repeated iteratively until values for the offset and gain in the calibration window of the data acquisition software were obtained that simultaneously yielded a zero force when the transducer shaft was load free and the proper force for the attached mass.

Immediately after releasing the specimen above the air table, the right-hand clamp was lowered to hold the specimen in place The sample was then allowed to melt, while being levitated over the table for approximately 5–6 minutes. The left-hand rotary clamp was then closed, and the specimen was checked to insure that it did not stick to the air table. Generally, the melted specimen had sagged somewhat between the table and the clamps, which can cause some sticking to the air table and erroneous force data at low strains. To overcome this problem, the slack was drawn up by jogging the clamps at an angular velocity of 1 rev/min. Sample testing was then initiated by setting the VCR to record mode, initiating the video timer, and choosing start test in the data acquisition software, respectively. Subsequent to the sample being elongated, the valve on the gas flow regulator was returned to the air side, and the required test parameters were entered into the data acquisition software. The rotary clamps and oven door were then opened, and the clamps were removed. Finally, the tested polymer was extracted from the stainless steel belts, and recycled for additional elongational tests.

TABLE III

190° C. SHEAR RHEOLOGY and EXTENSIONAL RHEOLOGY EXAMPLES

| EXAMPLE | $\eta_o$ (Pa - s) | $\eta_0$ (190° C.) Linear Equivalent (Pa - s) | $G_N^\circ$ (Pa) | $\eta_{ext}$ ratio | $\eta_o/\eta^*$ (100s$^{-1}$) | $E_a$ (kcal/mol) |
|---|---|---|---|---|---|---|
| MULTIPLY BRANCHED (>2) STRUCTURES | | | | | | |
| 1 (C1) | $1.0 \times 10^6$ | $1.0 \times 10^5$ | $1.3 \times 10^5$ | — | 710 | 18.4 |
| 2 (C2) | $9 \times 10^5$ | $4.5 \times 10^3$ | $\sim 6 \times 10^5$ | — | 130 | 15.0 |
| 3 (C3) | $>5 \times 10^7$ | $1.6 \times 10^6$ | $\sim 3 \times 10^4$ | — | >1200 | 17.6 |
| 4 (C4) | $>1 \times 10^7$ (No terminal region) | $3.5 \times 10^4$ | $\sim 3 \times 10^5$ | — | >2500 | 17.0 |
| 5 (BLEND 1) (2% C1/98% ECD103) | $7.5 \times 10^3$ | — | (Rubbery plateau not accessed) | 2.25 | 3.2 | 7.88 |
| 6 (BLEND 2) (2% C3/98% EDC103) | $8 \times 10^3$ | — | (Rubbery plateau not accessed) | 3.18 | 3.3 | 8.54 |
| H-STRUCTURES | | | | | | |
| 7 (H1) | $6.4 \times 10^3$ | $3.0 \times 10^2$ | $5 \times 10^5$ | — | 2.4 | 12.2 |
| 8 (H2) | $6.4 \times 10^4$ | $8.2 \times 10^2$ | $\sim 3 \times 10^5$ | — | 26 | 15.8 |
| LINEAR | | | | | | |
| 9 (ECD103) (Comparative) | $6.7 \times 10^3$ | $8.3 \times 10^3$ | — | 1.48 | 2.7 | 7.86 |

NOTES:
$G_N^\circ$ was evaluated as the value of G' at the frequency of G" minimum.
For comparison, the $\eta_0$ for a linear equivalent (same $M_w$) polymer is shown in col. 2 using the equation $\eta_0$ (190° C.) = $5.62 \times 10^{-14}$ $M_w^{3.36}$ (Pa - s) derived from Eq. 16, Mendelson, et al, J. Poly. Sci., Part A, 8, 105–126, (1970).

After calibrating the force transducer and measuring the dimensions of the parallelepiped test specimen, the temperature within the oven was checked to ensure that the oven was at the appropriate test temperature. The valve on the gas flow regulator was then turned 180° so that 99.6% pure nitrogen was delivered to the oven for temperature control. After waiting for the oven to be flooded with nitrogen gas (2–3 minutes), the specimen was loaded between the rotary clamps using the RME loading block (i.e. the top clamps are in locked or upper position). Typically, 16 (cm³/min) of gas were delivered to the air table, while 14 (cm³/min) were used to heat the rotary clamps. During loading it was important for the specimen not to touch the top of the air table, because this can cause the specimen to stick and an extra force will be measured during elongational testing.

Example 10

In situ Mixed Zirconocene Catalyst Example

This example illustrates the preparation of branched copolymers via an in situ coordination polymerization method using a mixed zirconocene catalyst as described in U.S. Pat. No. 5,470,811.
1) Preparation of Mixture of Isomers of (MeEtCp)$_2$ZrCl$_2$ [bis(1,2-MeEtCp)ZrCl$_2$, bis(1,3-MeEtCp)ZrCl$_2$, and (1,2-MeEtCp) (1,3-MeEtCp)ZrCl$_2$, where Me=methyl, Et=ethyl, Cp=cyclopentadienyl], Hereinafter Called (1,2/1,3-MeEtCp)$_2$ZrCl$_2$:

Methylcyclopentadiene dimer was cracked to the monomeric units over high viscosity silicone oil. A sample of the freshly prepared methylcyclopentadiene (100.5 g, 1.26 mol) was diluted in 500 cm³ tetrahydrofuran in a 3-liter flask. The flask was cooled in an ice-bath to 0° C. and 900 cm³ of 1.4

M solution of methyllithium in hexane was added slowly. After complete addition of the MeLi the ice-bath was removed and stirring continued for 3 hours at room temperature. Then the flask was cooled again to 0° C. and bromoethane (139.2 g, 1.28 mol) was added slowly as solution in THE. The mixture was then stirred for 15 hours. The resulting product was washed with distilled water and the organic layer was dried over sodium sulfate. This was then filtered and concentrated under vacuum and the concentrate was dissolved with a gentle $N_2$ sparge. The fraction boiling between 118–120° C. was saved.

Freshly distilled methylethyl-cyclopentadiene isomers (41.9 g, 0.388 mol) as above was dissolved in 30 cm$^3$ THF. 242 cm$^3$ of 1.6 M solution of n-BuLi in hexane was slowly added to this and stirring was continued for 3 hours after all the n-BuLi had been added. This solution was then added slowly to a slurry of $ZrCl_4$ (45.2 g; 0.194 mol.) in 200 cm$^3$ THF at −80° C. Stirring continued for 15 hours as the temperature slowly warmed up to 20° C. The solvent was removed under vacuum and the solid recovered was extracted with toluene. The toluene extract was concentrated and pentane was added to aid precipitation of the pure compound at −30° C.

2.) Preparation of Mixed Zirconocene Catalyst:

2300 g of Davison 948 silica dried at 200° C. was slurried in 6000 cm$^3$ heptane in a reaction flask. The flask was maintained at 24° C. and 2500 cm$^3$ of 30 wt % methylalumoxane in toluene was added. After 0.5 hours, the temperature was raised to 68° C. and maintained for 4 hours. Then a toluene solution of 24.88 g $(1,3\text{-MeBuCp})_2ZrCl_2$ (where Bu is butyl), mixed with 21.64 g of the isomeric mix $(1,2/1,3\text{-MeEtCp})_2ZrCl_2$, prepared above, was added slowly followed by a 1 hour hold of the reaction conditions. Then the resultant catalyst was washed with hexane 4 times and then dried to a free-flowing powder with a gentle $N_2$ flow.

Fluidized-Bed Polymerization. The polymerization was conducted in a continuous gas phase fluidized bed reactor. The fluidized bed was made up of polymer granules. The gaseous feed streams of ethylene and hydrogen together with liquid comonomer were mixed together in a mixing tee arrangement and introduced below the reactor bed into the recycle gas line. Hexene was used as comonomer. Triethyl aluminum (TEAL) was mixed with this stream as a 1% by weight solution in isopentane carrier solvent. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentration of all the gases were measured by an on-line gas chromatograph to ensure relatively constant composition in the recycle gas stream.

The solid catalyst (above) was injected directly into the fluidized bed using purified nitrogen as a carrier. Its rate was adjusted to maintain a constant production rate. The reacting bed of growing polymer particles was maintained in a fluidized state by the continuous flow of the make up feed and recycle gas through the reaction zone. A superficial gas velocity of 1–2 ft/sec was used to achieve this. The reactor was operated at a total pressure of 300 psig. To maintain a constant reactor temperature, the temperature of the recycle gas was continuously adjusted up or down to accommodate any changes in the rate of heat generation due to the polymerization.

The fluidized bed was maintained at a constant height by withdrawing a portion of the bed at a rate equal to the rate of formation of particulate product. The product was removed semi-continuously via a series of vanes into a fixed volume chamber, which was simultaneously vented back to the reactor. This allowed for highly efficient removal of the product, while at the same time recycling a large portion of the unreacted gases back to the reactor. This product was purged to remove entrained hydrocarbons and treated with a small stream of humidified nitrogen to deactivate any trace quantities of residual catalyst.

TABLE IV

Polymerization Run Conditions

| Metallocene Catalyst[1] | mixed Zr | Bed Weight (kg) | 110 |
|---|---|---|---|
| Zr (wt %) | 0.58 | TEAL Bed Concentration (ppm) | 49 |
| Al (wt %) | 14.92 | Catalyst Productivity (kg/kg) | 3900 |
| Al/Zr (mole/mole) | 87 | Bulk Density (g/cc) | 0.456 |
| Temperature (° C.) | 78.9 | Average Particle Size (microns) | 777 |
| Pressure (bar) | 21.7 | Melt Index (dg/min) | 0.83 |
| Ethylene (mole pct) | 50.2 | Melt Index Ratio | 21.5 |
| Hydrogen (mole ppm) | 147 | Density (g/cc) | 0.9166 |
| Hexene (mole pct) | 1.13 | Production rate (kg/hr) | 33 |

[1] See, Example 1-1.) and 1-2.) catalyst preparation above.

Mixed Zirconocene Catalyst Copolymer ("EXP 10")

This experimental copolymer was an ethylene-hexene copolymer produced with the mixed zirconocene catalyst described above. This example had the following properties: 0.9187 g/cc density, 0.91 dg/min $I_2$, 6.53 dg/min $I_{10}$, 21.1 dg/min $I_{21}$, 7.18 $I_{10}/I_2$, 23.21 $I_{21}/I_2$, 31,900 $M_n$, 98,600 $M_w$, 23,1700 $M_z$, 3.08 $M_w/M_n$, 2.35 $M_z/M_w$, and 10.9 cN melt strength.

Commercial Resins

Comparative Ex. A is ESCORENE® LD-702 from Exxon Chemical Co., a commercial ethylene-vinyl acetate copolymer (LDPE film resin) having a Melt Index of 0.3 g/10 min. a density of 0.943 and a vinyl acetate content of 13.3 wt. %. Comparative Ex. B is ESCORENE® LD-113 from Exxon Chemical Co., a commercial homopolyethylene polymer (LDPE packaging resin) having a Melt Index of 2.3 g/10 min. and a density of 0.921. Comparative Ex. C is EXCEED® 399L60 from Exxon Chemical Co., a commercial ethylene-hexene copolymer (LLDPE blown film resin) having a Melt Index of 0.75 g/10 min. and a density of 0.925. Comparative Ex. D is AFFINITY® PL-1840 from The Dow Chemical Company, a commercial ethylene-octene copolymer (LLDPE blown film resin) having a Melt Index of 1.0 g/10 min. a density of 0.908 and an octene content of 9.5 wt. %. Comparative Ex. E is ELVAX® 3135 from DuPont Co., a commercial ethylene-vinylacetate copolymer (EVA resin for blown film/flexible packaging applications) having Melt Index of 0.3 g/10 min. and a vinyl acetate content of 12 wt %.

Test Methods

Melt Index ($I_2$) of the resin samples was determined according to ASTM-D-1238, Condition E. Melt Flow Rate with a 10 kg top load ($I_{10}$ was determined according to ASTM-D-1239, Condition N. Melt Flow Rate with a 21.6 kg top load ($I_{21}$) was determined according to ASTM-D1238, condition F. Density of the resin samples was determined according to ASTM-D-1505. Bulk Density: The resin was poured via a ⅞" diameter funnel into a fixed volume cylinder of 400 cc. The bulk density is measured as the weight of resin divided by 400 cc to give a value in g/cc. Particle Size: The particle size was measured by determining the weight of material collected on a series of U.S. Standard sieves and determining the weight average particle size based on the sieve series used.

Description of Supercritical Fractionation

The use of supercritical fluids as solvents allows for the fractionation of polymers by either molecular weight or composition. For example, supercritical propane is a good solvent for polyethylene and other polyolefins (homo- and copolymers) at high enough pressure and temperature. If the temperature is kept constant and is high enough so that the polymer is totally non-crystalline, then one can fractionate the sample by molecular weight by varying the pressure. The critical pressure for solubility (that is, the pressure below which the polymer is no longer soluble in the supercritical propane) increases with molecular weight, so that as the pressure is dropped from some large values the higher molecular weight fractions will drop out of solution first, followed by progressively smaller molecular weight fractions as the pressure is lowered (Watkins, J. J.; Krukonis, V. J.; Condo, P. D.; Pradhan, D.; Ehrlich, P.; *J Supercritical Fluids* 1991, 4, 24–31). On the other hand, if the pressure is held constant and the temperature is lowered, then the most crystallizable portions of the polymer will come out first. Since for ethylene-α-olefin copolymers the crystallizability is generally controlled by the amount of ethylene in the chain, such an isobaric temperature profiling will fractionate the sample by composition (Watkins, J. J., Krukonis, V. J.; Condo, P. D.; Pradhan, D.; Ehrlich, P.; *J Supercritical Fluids* 1991, 4, 24–31; Smith, S. D.; Satkowski, M. M.; Ehrlich, P.; Watkins, J. J.; Krukonis, V. J.; *Polymer Preprints* 1991, 32(3), 291–292). Thus, one has the option of fractionating by either molecular weight or composition from the same supercritical solution, by varying either pressure or temperature, respectively. In the samples used herein, we chose to obtain fractions of various molecular weights by isothermal pressure variation.

Supercritical Fractionation Example 100 grams of EXP10 resin was fractionated using a supercritical propane solution in the manner described above. This was carried out by Phasex Corp., 360 Merrimack St., Lawrence, Mass. 01843. This resulted in 14 fractions with the following molecular weights:

TABLE V

| Fraction | Amount (g) | $M_n$ (1000 g/mol) | $M_w$ (1000 g/mol) | $M_w/M_n$ |
|---|---|---|---|---|
| EXP10-1 | 18.50 | 18.8 | 88.8 | 4.72 |
| EXP10-2 | 24.62 | 31.5 | 87.9 | 2.79 |
| EXP10-3 | 15.76 | 23.6 | 85.0 | 3.60 |
| EXP10-4 | 10.24 | 17.0 | 80.9 | 4.76 |
| EXP10-5 | 6.36 | 14.6 | 44.1 | 3.01 |
| EXP10-6 | 6.51 | 30.1 | 62.7 | 2.08 |
| EXP10-7 | 5.93 | 37.3 | 72.9 | 1.96 |
| EXP10-8 | 6.65 | 48.0 | 91.9 | 1.91 |
| EXP10-9 | 2.12 | 63.7 | 110. | 1.73 |
| EXP10-10 | 3.30 | 78.9 | 128. | 1.63 |
| EXP10-11 | 3.38 | 88.1 | 138. | 1.56 |
| EXP10-12 | 1.83 | 88.0 | 146. | 1.65 |
| EXP10-13 | 1.98 | 131. | 220. | 1.68 |
| EXP10-14 | 1.96 | 145. | 268. | 1.85 | note:
Molecular weights (weight average molecular weight ($M_w$) and number average molecular weight ($M_n$) were measured by Gel Permeation Chromatography, unless other wise noted, using a Waters 150 Gel Permeation Chromatograph equipped with a differential refractive index detector (DRI) and calibrated using polystyrene standards. Samples were run in 1,2,4-trichlorobenzene (145° C.) using three Shodex GPC AT-80 M/S columns in series. This general technique is discussed in "Liquid Chromatography of Polymers and Related Materials III" J. Cazes Ed., Marcel Decker, 1981, page 207, which is incorporated by reference for purposes of U.S. patent practice herein. No corrections for column spreading were employed; however, data on generally accepted standards, e.g. National Bureau of Standards Polyethylene 1475, demonstrated a precision of 0.1 units for $M_w/M_n$ which was calculated from elution times. The numerical analyses were performed using Expert Ease software available from Waters Corporation.

Comparison of Commercial Polymers with Fractionated Polymer Samples

TABLE VI

| Polymer | T (° C.) | $\eta_0$ (Pa - s) | $\eta_0$ Linear Equiv. (Pa - s) | $\eta_0/\eta^*_{100}$ | $G_N^0$ (Pa) | $\eta_{ext}$ ratio |
|---|---|---|---|---|---|---|
| A--LD-702 | 190 | 81740 | | 71 | $2.3 \times 10^6$ | |
| B--LD-113 | 190 | 10000 | | 19 | $2.3 \times 10^6$ | |
| C--ECD-399L60 | 190 | 10500 | | 3.3 | $2.3 \times 10^6$ | |
| D--PL-1840 | 190 | 20570 | | 12.7 | $2.3 \times 10^6$ | |
| E--ELVAX 3135 | 190 | 45000 | | 45 | $2.3 \times 10^6$ | 4.12 |
| EXP10 - Bulk | 190 | 6800 | $6.7 \times 10^3$ | 3.6 | | 2.8 |
| EXP10-9 | 190 | 12000 | $4.9 \times 10^3$ | 5 | $1.45 \times 10^6$ | 1.43 |
| EXP10-10 | 190 | 30000 | $8.1 \times 10^3$ | 9.1 | $1.7 \times 10^6$ | 2.5 |
| EXP10-11 | 190 | $>4.1 \times 10^4$ | $1.0 \times 10^4$ | >9.5 | $1.9 \times 10^6$ | 2.22 |
| EXP10-12 | 190 | $>8.94 \times 10^4$ | $1.3 \times 10^4$ | >21 | $1.74 \times 10^6$ | 3.15 |
| EXP10-13 | 190 | $>1.95 \times 10^5$ | $5.0 \times 10^4$ | >33 | $1.45 \times 10^6$ | |
| EXP10-14 | 190 | $>1.45 \times 10^6$ | $9.7 \times 10^4$ | >181 | $1.3 \times 10^6$ | |

Note: The values of the plateau modulus $G_N^0$ were calculated according to the equation $G_N^0 = 4.83\, G''(\omega)_{max}$, where $G''(\omega)_{max}$ stands for the value of $G''$ at the frequency at which $G''$ is maximum, see R. S. Marvin and H. Oser, J.Res. Nat. Bur. Std., 66B, 171 (1962); and, H. Oser and R. S. Marvin, ibid., 67B, 87 (1963). For comparison, the $\eta_0$ for a linear equivalent (same $M_w$) polymer is shown in col. 2 using the equation $\eta_0(190°\,C.) = 5.62 \times 10^{-14}\, M_w^{3.36}$(Pa-s) derived from Eq. 16, Mendelson, et al, J. Poly. Sci., Part A, 8, 105–126. (1970).

Discussion

Therefore we expect that the multiply branched coomb and H-shaped polymers of the invention and comb/linear copolymer blends are expected to exhibit high levels of melt strength at low MIR in view of their strain thickening in uniaxial extension. The comb copolymers and their blends with linear copolymers show strain hardening (even at low levels of incorporation). Low levels of comb copolymers in a blends with linear polymer will exhibit little effect on shear thinning (or MIR), but can cause a significant enhancement in strain thickening and melt strength. This gives one the opportunity to design for that combination of properties for those applications where it is desirable. The neat comb samples also exhibit the suppression of plateau modulus, as distinguished from linear copolymers alone, and should be beneficial for extrudability.

We claim:

1. A polymer composition comprising polymers consisting essentially of saturated hydrocarbon polymers wherein the saturated hydrocarbon polymers have
    a) a Newtonian limiting viscosity ($\eta_0$) at 190° C. at least 50% greater than that of a linear olefinic polymer of the same chemical composition and weight average molecular weight;
    b) a ratio of the rubbery plateau modulus at 190° C. to that of a linear polymer of the same chemical composition less than 0.5;
    c) a ratio of the Newtonian limiting viscosity ($\eta_0$) to the absolute value of the complex viscosity in oscillatory shear ($\eta^*$) (at 100 rad/sec at 190° C.) of at least 5 wherein the saturated hydrocarbon polymers consist of a backbone chain and sidechains derived from ethylene alone or ethylene and one or more of propylene, 1-butene, 1-pentene, 1-hexene, 1-octene, 1-decene, 1-dodecene, 4-methyl-pentene-1, styrene, alkyl styrenes, norbornene, and alky-substituted norbornenes.

2. The composition of claim 1 wherein said backbone chain and said sidechains are consisting essentially of an ethylene-butene copolymer structure.

3. The composition of claim 1 wherein said backbone chain and said sidechains are consisting essentially of an ethylene-hexene copolymer structure.

4. The composition of claim 1 wherein said backbone chain and said sidechains are consisting essentially of an ethylene-propylene copolymer structure.

5. The composition of claim 1 wherein the Newtonian limiting viscosity ($\eta_0$) at 190° C. is at least twice as great as that of a linear olefinic polymer of the same chemical composition and weight average molecular weight.

6. The composition of claim 1 wherein the ratio of the rubbery plateau modulus at 190° C. to that of a linear polymer of the same chemical composition is less than 0.3.

7. The composition of claim 1 additionally having a ratio of the extensional viscosity measured at a strain rate of 1 sec$^{-1}$, 190° C., and time=3 seconds (i.e., a strain of 3) to that predicted by linear viscoelasticity at the same temperature and time of 2 or greater seconds.

* * * * *